United States Patent
Okabe

(10) Patent No.: US 8,499,006 B2
(45) Date of Patent: Jul. 30, 2013

(54) DATA MIGRATION SYSTEM AND DATA MIGRATION METHOD

(75) Inventor: Kouya Okabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 13/280,044

(22) Filed: Oct. 24, 2011

(65) Prior Publication Data

US 2012/0102069 A1   Apr. 26, 2012

(30) Foreign Application Priority Data

Oct. 26, 2010   (JP) ................................. 2010-239982

(51) Int. Cl.
*G06F 12/00* (2006.01)
*G06F 5/00* (2006.01)

(52) U.S. Cl.
USPC .......................................... 707/786; 707/829

(58) Field of Classification Search
None
See application file for complete search history.

(56) References Cited

U.S. PATENT DOCUMENTS

| 5,778,222 A * | 7/1998 | Herrick et al. ................ 707/702 |
| 7,278,585 B2 | 10/2007 | Boitsov et al. |
| 8,312,044 B2 * | 11/2012 | Taniguchi ..................... 707/786 |
| 2008/0149714 A1 | 6/2008 | Cheung et al. |
| 2008/0270697 A1 * | 10/2008 | Ueoka et al. .................. 711/114 |

FOREIGN PATENT DOCUMENTS

JP   2007-193826 A   8/2007

* cited by examiner

*Primary Examiner* — James Trujillo
*Assistant Examiner* — Miranda Huang
(74) *Attorney, Agent, or Firm* — Canon USA Inc. IP Division

(57) ABSTRACT

In a system for migrating data between document management applications, if an inheritance setting of an access right to a folder in a source document management application is a first inheritance setting for inheriting an access right to a parent folder, the inheritance setting of the access right is changed to a second inheritance setting for setting an access right exclusively for the folder while the same access right as the access right to the parent folder is set. Then, the folder is migrated to the destination document management application. If a hierarchy including the folder to be migrated exceeds an upper limit on the number of hierarchies in the destination document management application, the folder is stored in a shallower hierarchy in the destination document management application.

14 Claims, 18 Drawing Sheets

FIG. 5

| FOLDER PATH | INHERITANCE | ACCESS RIGHT |
|---|---|---|
| A¥ | SET EXCLUSIVE AUTHORITY | USER A=DELETION RIGHT, GROUP B= READING RIGHT |
| A¥B | INHERIT PARENT'S AUTHORITY | — |
| A¥B¥C | SET EXCLUSIVE AUTHORITY | USER B=EDITING RIGHT, USER C=DELETION RIGHT, GROUP B= READING RIGHT |
| A¥D | INHERIT PARENT'S AUTHORITY | — |
| ... | ... | ... |

FIG. 8

SUBFOLDERS UNDER THIS FOLDER PATH AFTER DIVISION ARE IMPORTED.
FOLDER PATH
AAAAA¥BBBBB¥CCCCC¥DDDDD¥EEEEE¥FFFFF¥GGGGG¥
LIST OF SUBFOLDERS AFTER DIVISION
HHHH

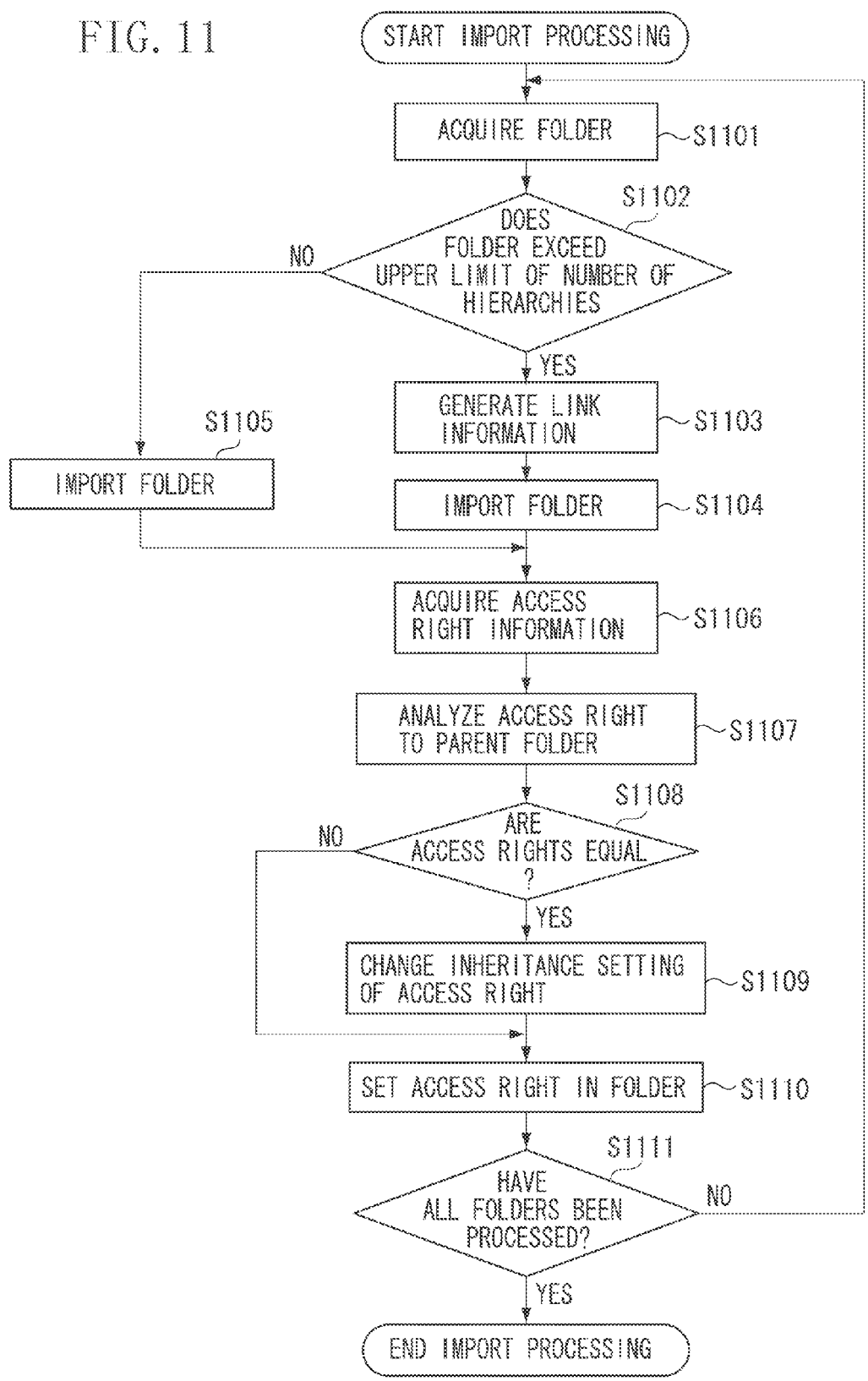

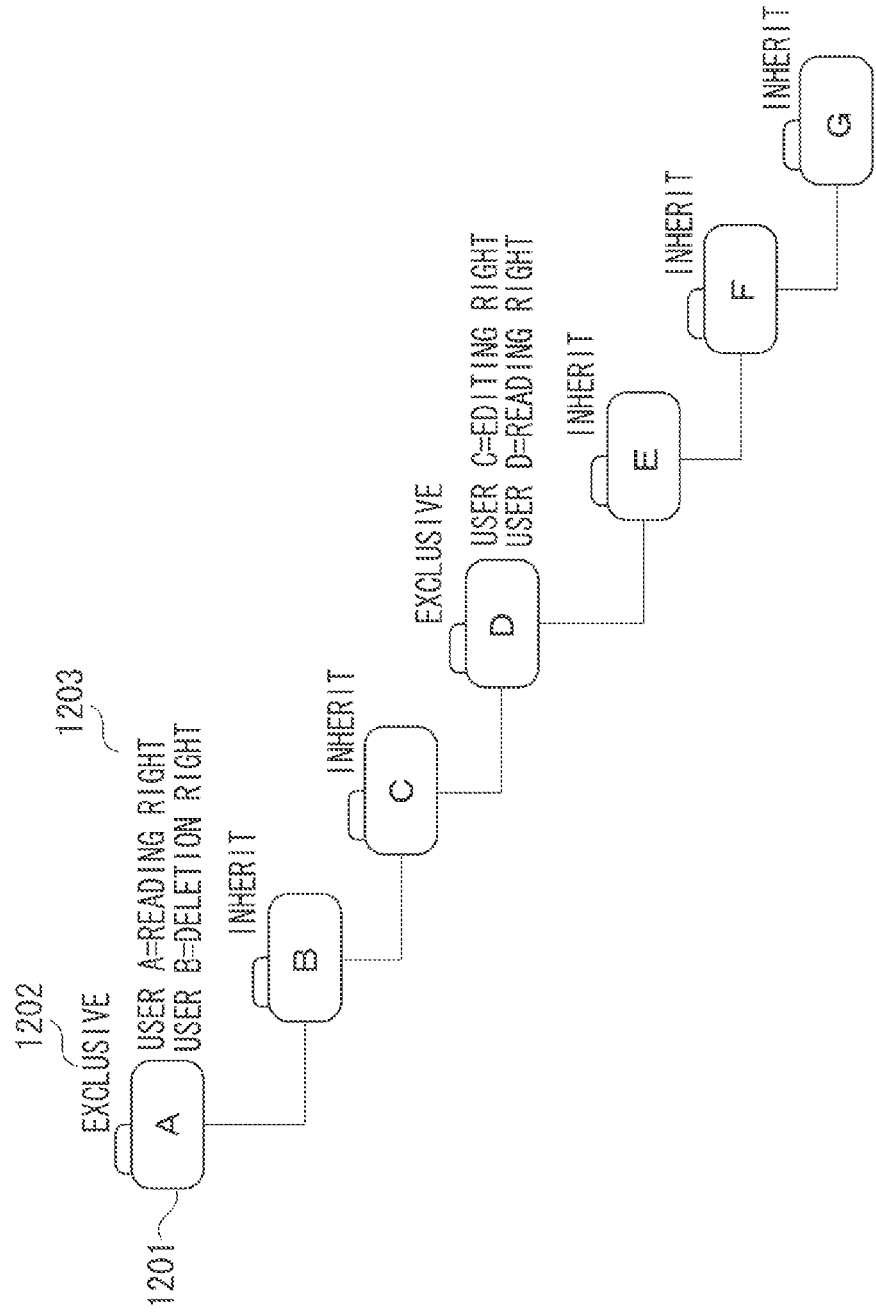

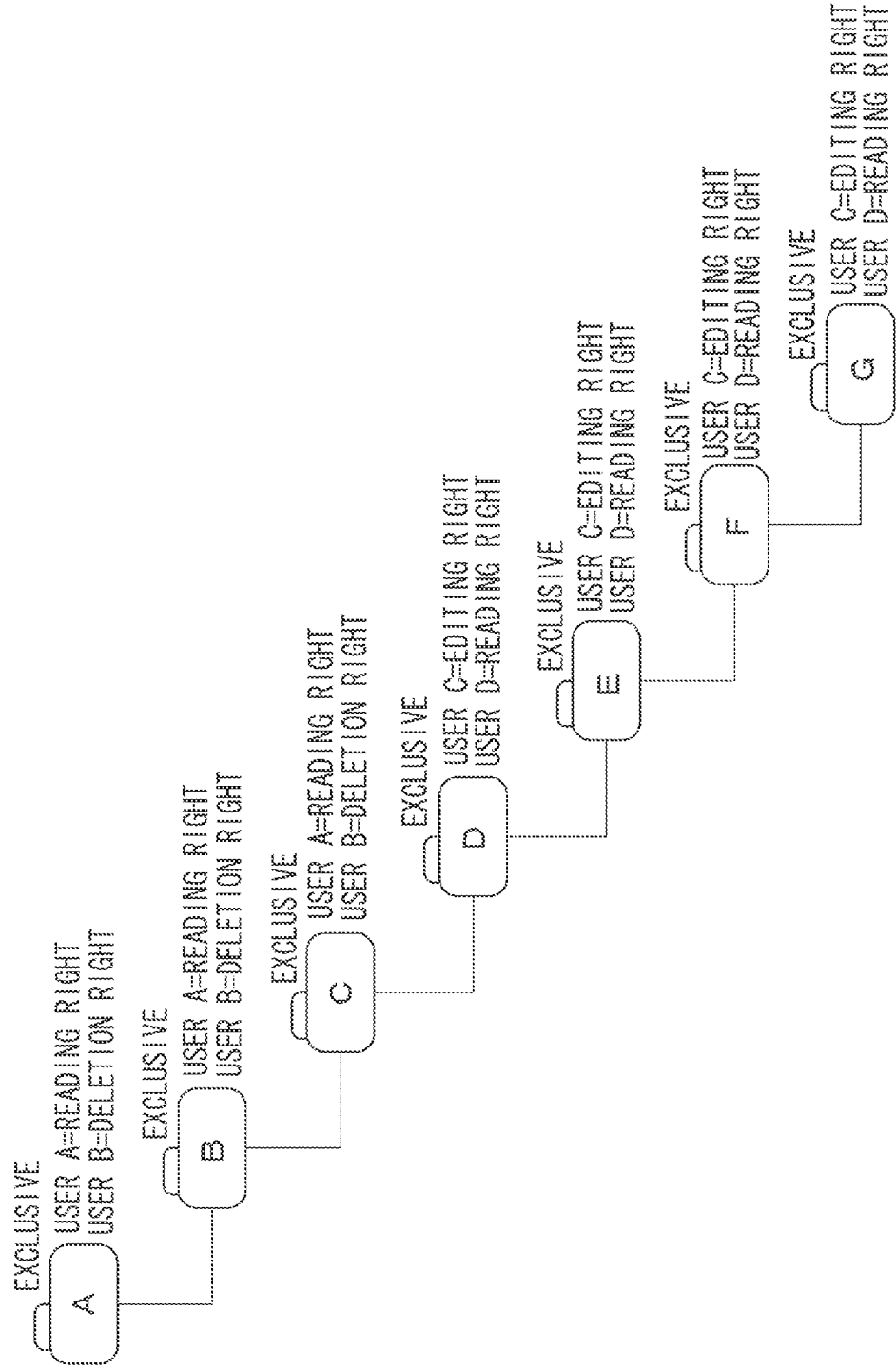

DATA MIGRATION SYSTEM AND DATA MIGRATION METHOD

BACKGROUND OF THE INVENTION

1. Field of the Invention

The present invention relates to a data migration system, a data migration method, and a computer readable storage medium for migrating an access right in data migration between different document management systems.

2. Description of the Related Art

In a document management system, access rights "who" and "what can be executed" can be normally set in folders and documents. An attempt to individually set access rights in all folders and documents takes thousands of man-hours, and makes the subsequent maintenance difficult.

In the document management system, "an access right inherits parent's authority" can be set for the designated folder or document. Japanese Patent Application Laid-Open No. 2007-193826 discusses setting an access right only in the highest hierarchy and determining, when an access request is issued to hierarchies other than the highest hierarchy, whether access can be made by referring to the access right in the highest hierarchy.

If data is migrated from a first document management system (i.e. a source document management system) to a second document management system (i.e. a destination document management system), wherein the first and second document management systems have different specifications, a wrong access right may be set in a conventional technique.

For example, the destination document management system may be lower in an upper limit on the depth of folder hierarchies. In this case, the applicant considers a technique that a folder in the hierarchy exceeding the upper limit may be moved to the higher hierarchy. Thus, data can be migrated without exceeding the upper limit. If an access right to the folder that has been moved to the higher hierarchy is set to "inherit parent's authority", a wrong access right may be set in an area to which the folder has been moved.

If an access right in the highest hierarchy is referred to, a flexible access right cannot be set. However, a wrong access right may be set depending on how a folder exceeding an upper limit on the number of hierarchies is moved.

SUMMARY OF THE INVENTION

The present invention is directed to a data migration system capable of correctly migrating an access right when data is migrated between different document management systems.

According to an aspect of the present invention, a data migration system for migrating data managed in a folder having a hierarchical structure from a source document management application to a destination document management application, which differs in an upper limit on the number of hierarchies from the source document management application includes a setting unit configured to change, when an inheritance setting of an access right set in a folder to be migrated in the source document management application is an inheritance setting for inheriting an access right to a parent folder, the inheritance setting in the folder to be migrated to an inheritance setting for setting an access right exclusively for the folder while setting a similar access right to the access right to the parent folder in the folder to be migrated, an export unit configured to export the folder to be migrated, data included in the folder, and information relating to an access right to the folder, an import unit configured to import, when a hierarchy including the folder to be migrated, which has been exported by the export unit, exceeds the upper limit on the number of hierarchies in the destination document management application, a folder under the hierarchy exceeding the upper limit and data included in the folder to a hierarchy shallower than the upper limit in the destination document management application, and a change unit configured to change, when the access right to the folder imported by the import unit, which has been analyzed based on the access right information, and the access right to the parent folder of the folder are equal to each other, an inheritance setting of the access right to the folder imported by the import unit to an inheritance setting for inheriting the access right to the parent folder.

In the present invention, when the data is migrated between the different document management systems, the access right can be correctly migrated.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of an access right management table according to the exemplary embodiment of the present invention.

FIG. 8 illustrates an example of a log of a precheck result.

FIG. 11 is a flowchart of import processing.

FIG. 12A illustrates an example of data migration and an access right before migrating, FIG. 12B illustrates an example of data migration and an access right after export.

DESCRIPTION OF THE EMBODIMENTS

Various exemplary embodiments, features, and aspects of the invention will be described in detail below with reference to the drawings.

While a target in which an access right is to be set is described as a "folder" in the present exemplary embodiment, the target is not limited to a folder such as so-called Microsoft Windows (registered trademark) as long as it can implement a hierarchical structure.

Figure 1:
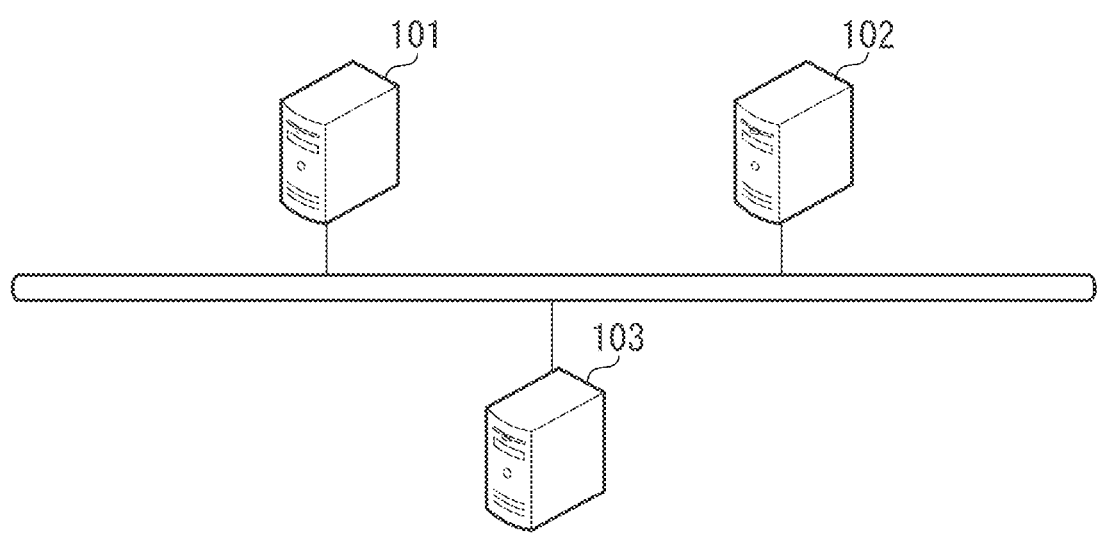
FIG. 1 illustrates a system configuration according to an exemplary embodiment of the present invention.

A first exemplary embodiment of the present invention will be described with reference to FIGS. 1 to 12. FIG. 1 is a schematic view of a data migration system according to the present exemplary embodiment. The data migration system includes at least a source server 101, a destination server 102, and a client personal computer (PC) 103.

A source document management application in data migration is operating in the source server 101. A destination document management application in data migration is operating in the destination server 102. The client PC 103 is a PC of a user who uses a document management system.

A network such as Ethernet (registered trademark) connects the plurality of PCs (the servers 101 and 102 and the client PC 103). All the PCs include hardware components such as a central processing unit (CPU), a random access memory (RAM), a read-only memory (ROM), a hard disk drive (HDD), and a network interface card.

For convenience, only three PCs are illustrated in FIG. 1. However, three or more PCs may exist. On the other hand, the source server 101 and the destination server 102 may be the same PC. While a printer and a network apparatus are omitted, they may be included in the data migration system.

Figure 2:
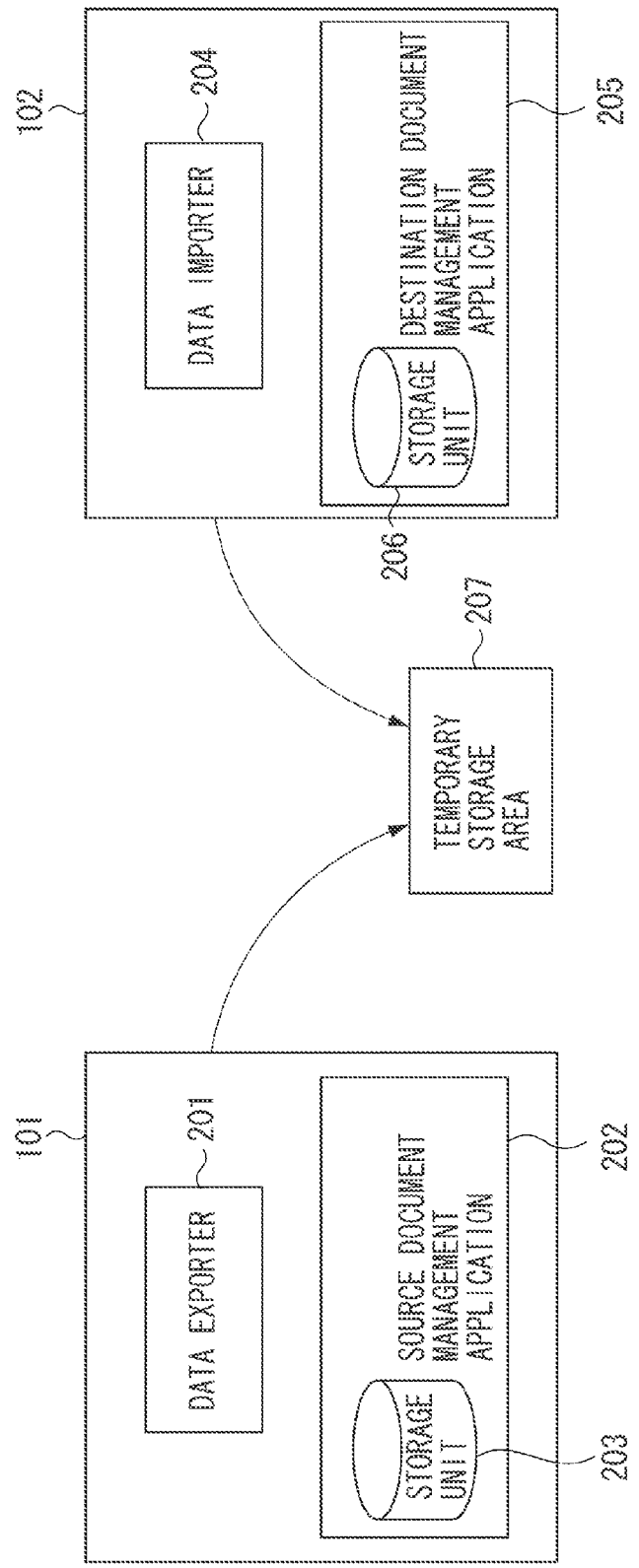
FIG. 2 illustrates a flow of data migration according to the exemplary embodiment of the present invention.

FIG. 2 illustrates a flow of data migration from the source server 101 to the destination server 102. The source server 101 includes a data exporter 201, a source document management application 202, and a storage unit 203.

The storage unit 203 stores various types of information in document management, including folders and documents. The source document management application 202 performs processing such as registration, deletion, reading, acquisition, and search of the document for the information stored in the storage unit 203. The data exporter 201 is an application for extracting data stored in the storage unit 203, and stores the extracted data in a temporary storage area 207.

The temporary storage area 207 may be in a storage device in the source server 101, may be in a storage device in the destination server 102, or may be arranged on media such as another PC, a universal serial bus (USB) memory, a compact disk (CD), and a digital versatile disk (DVD).

The destination server 102 includes a data importer 204, a destination document management application 205, and a storage unit 206. The functions of the destination document management application 205 and the storage unit 206 are respectively the same as those of the source document management application 202 and the storage unit 203. The data importer 204 is an application for registering the data in the temporary storage area 207 in the storage unit 206.

The document management applications 202 and 205 and the storage units 203 and 206 may respectively exist in separate PCs. Similarly, the data exporter 201 and the data importer 204 may exist in a different PC from the one in which the storage units 203 and 206 are stored.

Figure 3:
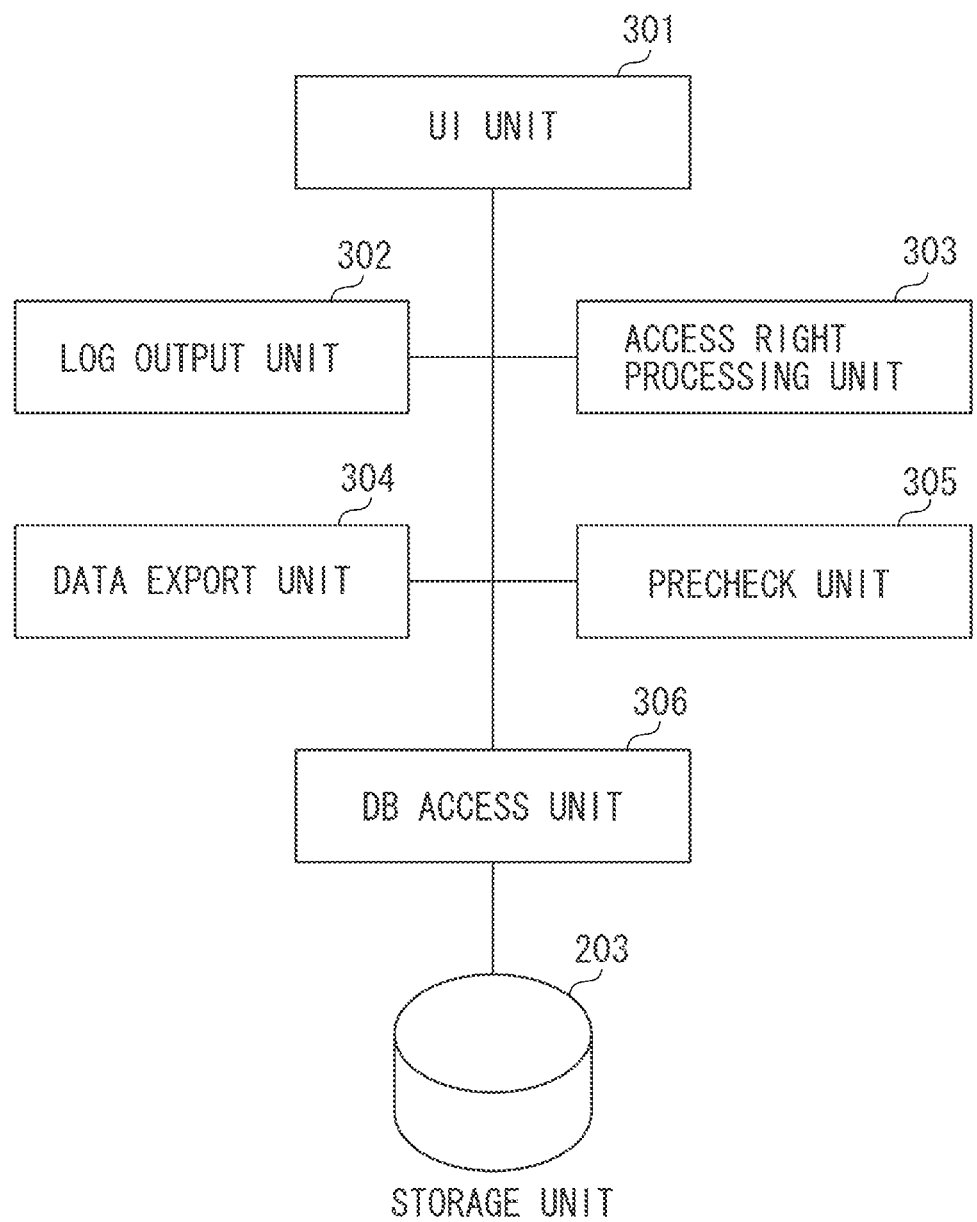
FIG. 3 illustrates a software configuration of a data exporter according to the exemplary embodiment of the present invention.

FIG. 3 illustrates an example of a software configuration of the data exporter 201. The data exporter 201 is a program that operates on the CPU in the source server 101.

A UI unit 301 displays necessary information for a user while receiving input from the user. A log output unit 302 outputs a log of an operation result or an operating condition of the data exporter 201.

An access right processing unit 303 acquires access right information existing in the storage unit 203. At this time, if an inheritance setting of an access right to a folder is set to "inherit parent's authority", it is changed to "set exclusive authority", and an access right set in a parent folder is set in the folder. Details of the access right information will be described below with reference to FIG. 5.

A data export unit 304 extracts all data to be migrated, which exist in the storage unit 203, into the temporary storage area 207. While processing for converting a format of a document is performed, as needed, description thereof is omitted in the present exemplary embodiment. A precheck unit 305 determines whether data can be migrated to the destination document management application 205 before actually exporting the data.

For example, it is determined whether the number of documents, the document size, and the number of folder hierarchies do not exceed their upper limits in the destination document management application 205. A database (DB) access unit 306 accesses the storage unit 203, and reads and writes the data.

Figure 4:
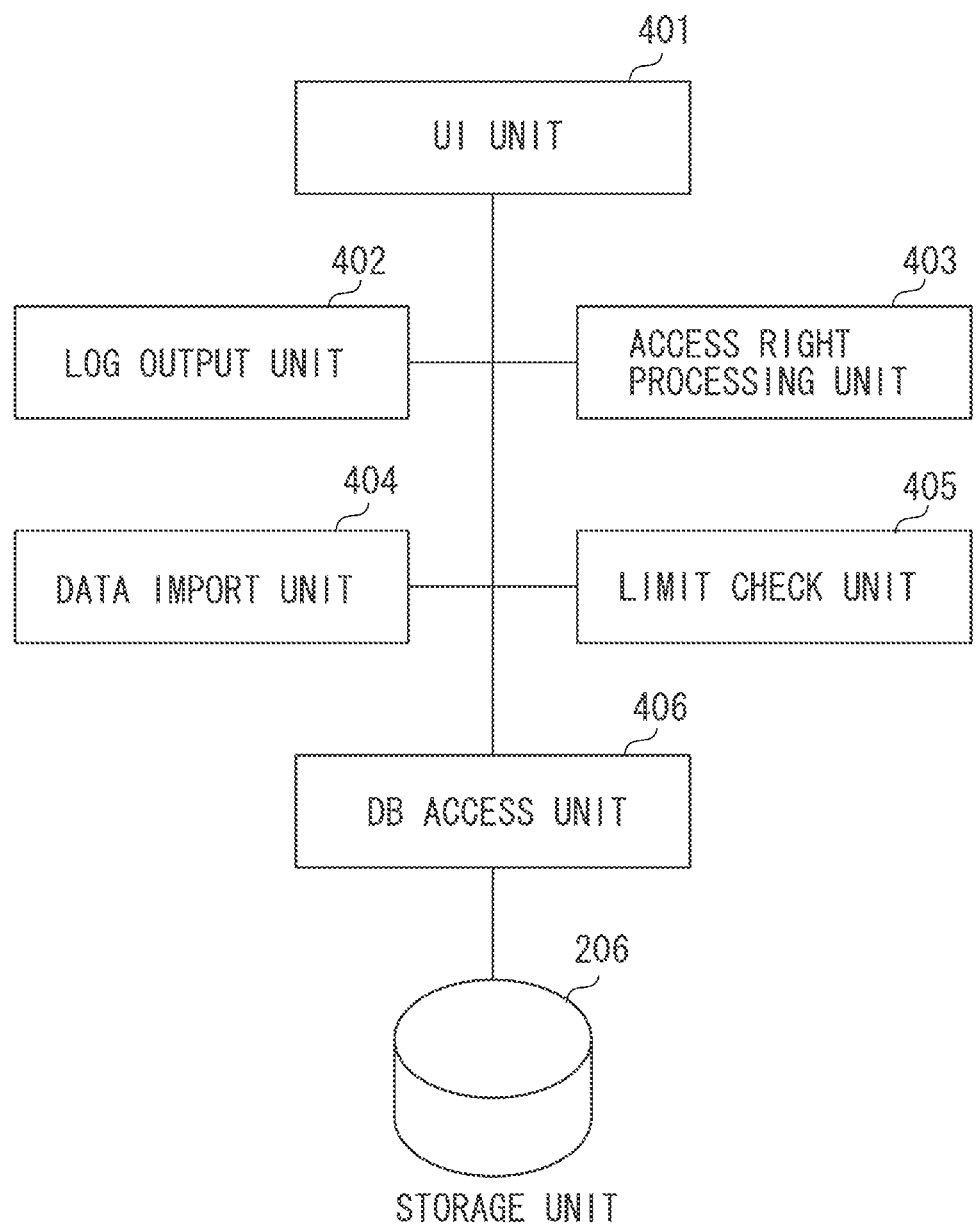
FIG. 4 illustrates a software configuration of a data importer according to the exemplary embodiment of the present invention.

FIG. 4 illustrates an example of a software configuration of the data importer 204. The data importer 204 is a program that operates on the CPU in the destination server 102.

A UI unit 401 displays necessary information for the user while receiving input from the user. A log output unit 402 outputs a log of an operation result or an operating condition of the data importer 204. An access right processing unit 403 registers access right information, which exists in the temporary storage area 207, in the storage unit 206.

At this time, if an access right to a folder is the same as an access right to a parent folder, an inheritance setting of the access right is changed to "inherit a parent's access right".

A data import unit 404 registers data to be migrated, which exists in the temporary storage area 207, in the storage unit 206. A limit check unit 405 checks whether the data to be migrated, which exists in the temporary storage area 207, corresponds to upper limits in the destination document management application 205.

Examples include the number of documents, the document size, and the number of folder hierarchies. In the present exemplary embodiment, particularly the number of folder hierarchies is checked. More specifically, the limit check unit 405 determines whether a hierarchy exceeding the upper limit in the number of folder hierarchies in the destination document management application 205 is included in the temporary storage area 207.

If the hierarchy exceeding the upper limit in the number of folder hierarchies is included in the temporary storage area 207, the data import unit 404 moves a folder in the hierarchy exceeding the upper limit in the number of folder hierarchies to a higher hierarchy. Link information is set to prove that the folder hierarchies and the higher hierarchy are originally connected to each other.

A DB access unit 406 accesses the storage unit 206, and reads and writes data. A precheck unit may exist in the data importer 204, which is not illustrated. If a precheck unit exists in the data importer 204, its function is similar to that of the precheck unit 305, and its operation is performed before the data is imported.

FIG. 5 illustrates an example of a table for managing access right information. An access right management table 501 is stored in each of the storage units 203 and 206. A column 502 stores information relating to a folder in which an access right is to be set. While the folder is recorded in a path format in the present exemplary embodiment, the folder may be recorded in any format as long as a hierarchical structure can be recognized.

A column (an inheritance setting) 503 retains information indicating whether a parent's access right is inherited. If the access right is inherited, the same access right as that to a parent folder is set in the folder. A parent of a folder means the next hierarchy above a hierarchy including the folder.

A column (an access right) 504 retains information relating to authority that a user or a group has for a folder. The authority includes some types of rights such as a deletion right, an editing right, and a reading right. If "inherit parent's authority" is set in the column 503, nothing is set in the column 504.

Figure 6:
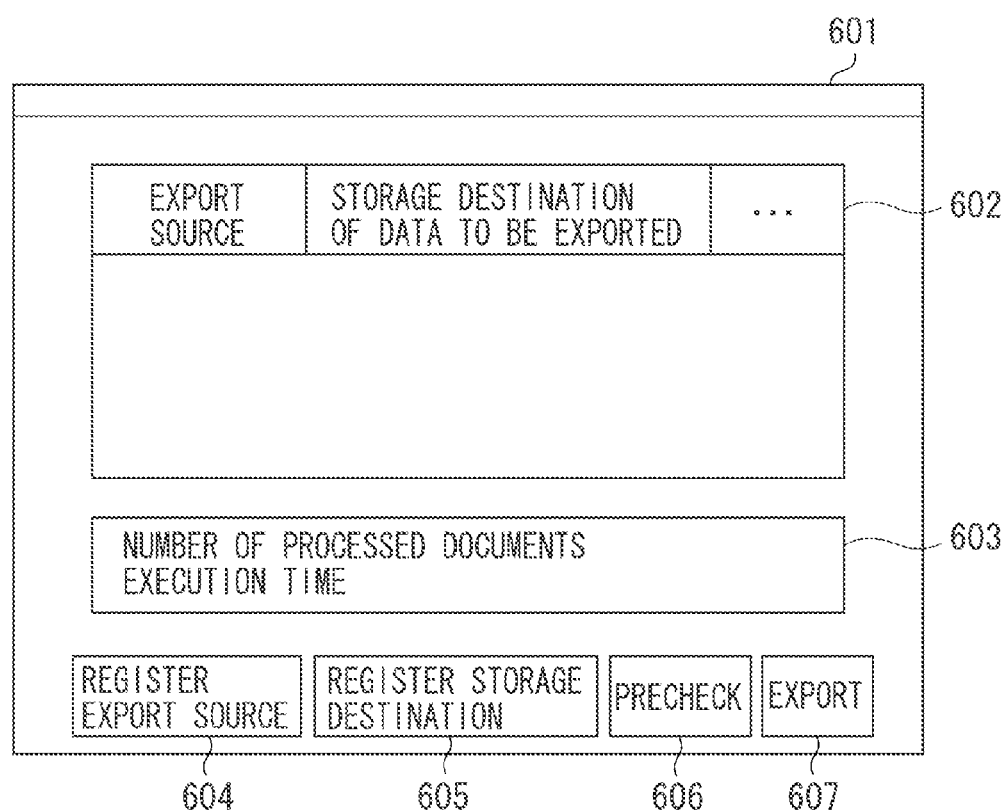
FIG. 6 illustrates an example of a UI in a data exporter.

FIG. 6 illustrates an example of a UI 601 in the data exporter 201. The UI 601 may be executed in any format, for example, on an OS as a stand-alone application or on a web browser.

Data to be exported in the source document management application 202 and an export destination are displayed in an area 602. While a unit of the data to be exported is optional, a hierarchy higher than a hierarchy including a folder (called a library or a cabinet, for example) may be registered. The export destination is a path in the temporary storage area 207.

In addition thereto, the number of documents and the number of folders in the data to be exported may be displayed. Information during processing, such as the number of processed documents and an execution time, may be displayed. A plurality of data to be exported and a plurality of export destinations may be registered.

A condition during processing is displayed in an area 603. If a plurality of data to be exported and a plurality of export destinations are registered in the area 602, their respective total values are displayed.

A button 604 is used to set a location of data to be exported. A button 605 is used to set a storage destination of exported data. A button 606 is used to perform a precheck before actually exporting data. A button 607 is used to export data.

While the UI 601 has been described as an example, all elements are not necessarily required. Conversely, an element to be conveniently used by the user may be added.

Figure 7:
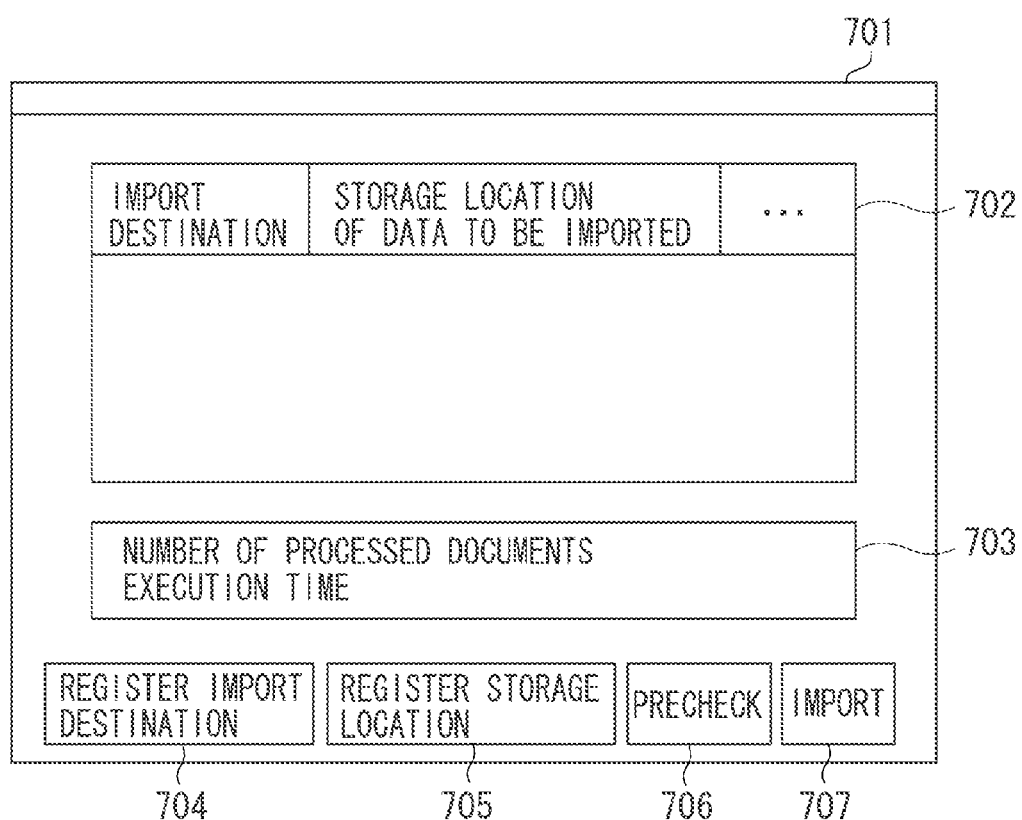
FIG. 7 illustrates an example of a UI in a data importer.

FIG. 7 illustrates an example of an UI 701 in the data importer 204. The UI 701 may be executed in any format, for example, on an OS as a stand-alone application or on a web browser.

An import destination in the destination document management application 205 and a storage location of data to be imported are displayed in an area 702. The storage location of the data to be imported is a path in the temporary storage area 207. In addition thereto, the number of documents and the number of folders may be displayed, like those in the UI 601 in the data exporter 201. Information during processing, such as the number of processed documents and an execution time, may be displayed. A plurality of import destinations and a plurality of storage locations of the data to be imported may be registered.

A condition during processing is displayed in an area 703. If a plurality of import destinations and a plurality of storage locations of the data to be imported are registered in the area 702, their respective total values are displayed.

A button 704 is used to set an import destination. A button 705 is used to set a storage location of imported data. A button 706 is used to perform a precheck before actually importing data. A button 707 is used to import data.

The UI 701 is not limited to a configuration illustrated in FIG. 7, similarly to the UI 601 in the data exporter 201.

FIG. 8 illustrates an example of a log, which is to be output when a folder hierarchy exceeds an upper limit on the number of folder hierarchies, among logs of processing results by the precheck unit 305. The log output unit 302 outputs the log illustrated in FIG. 8.

If there exists one, exceeding the upper limit on the number of folder hierarchies in the destination document management application 205, among the folder hierarchies in the storage unit 203, a result obtained by dividing the folder hierarchy is output.

In the example illustrated in FIG. 8, a path to a folder positioned in a higher hierarchy after the division and a list of folders just under the folder path are displayed. If a plurality of hierarchies exceeds the upper limit, all paths are output. If a path to a folder in a lower hierarchy after the division exceeds the upper limit again, the log is recursively output toward the path to the folder in the lower hierarchy.

A log of a precheck result in the data importer 204 is basically similar, which is not illustrated. A log of a result obtained by actually importing data is almost similar in content.

Figure 9:
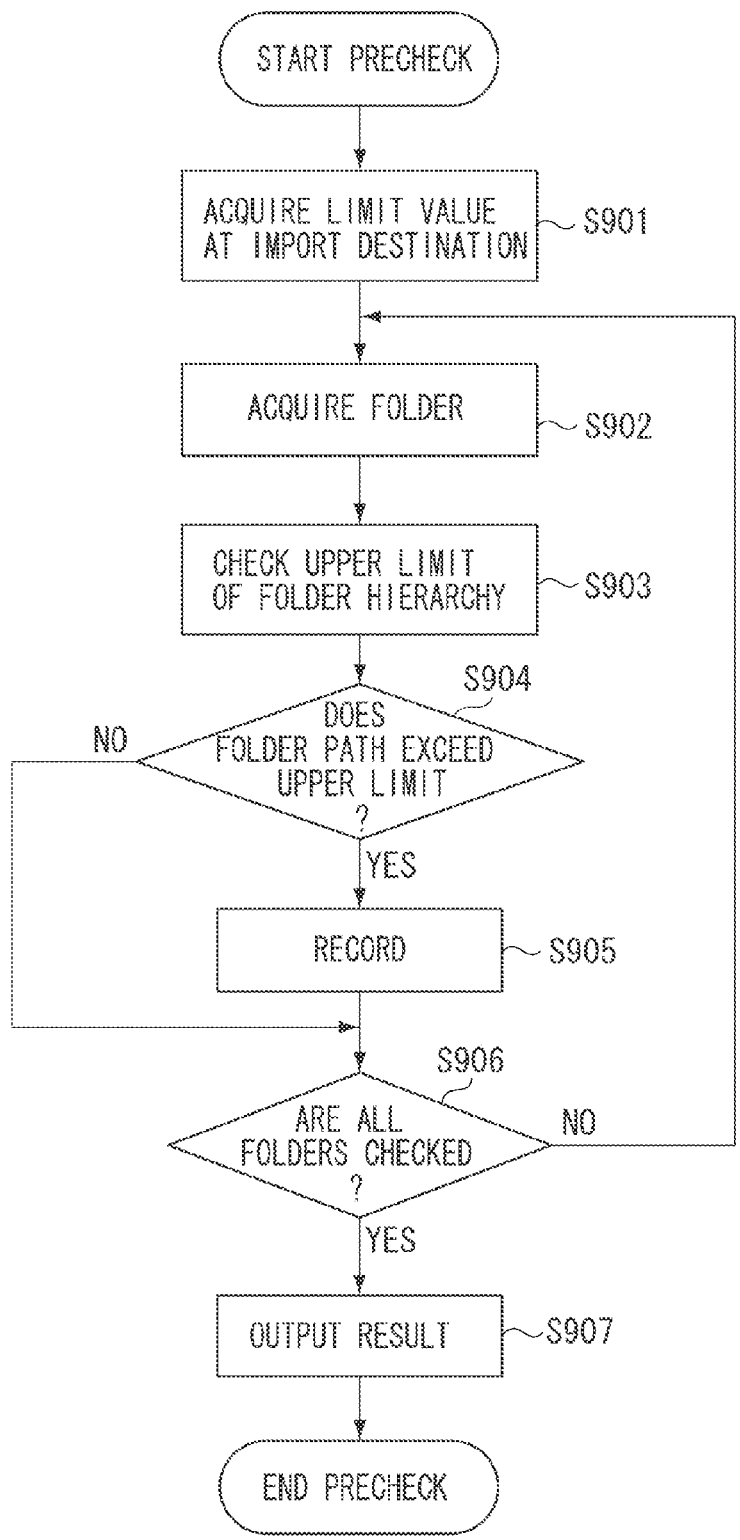
FIG. 9 is a flowchart of precheck processing.

FIG. 9 is a flowchart illustrating a flow of precheck processing by the precheck unit 305 in the data exporter 201. In the present exemplary embodiment, description is limited to processing relating to an upper limit on the number of folder hierarchies in the precheck processing. The precheck processing is performed in response to the press of the button 606 in the UI 601. Data, which is registered as one to be exported in the area 602, is to be prechecked.

In step S901, the precheck unit 305 first acquires an upper limit on the number of hierarchies in the destination document management application 205. The upper limit may be previously registered in the data exporter 201, or may be inquired of the destination document management application 205.

In step S902, the precheck unit 305 then acquires a folder to be migrated from the storage unit 203 via the DB access unit 306. The folder to be acquired may be limited to a folder in the lowest hierarchy within a migrating target range.

In step S903, the precheck unit 305 then checks the upper limit on the number of folder hierarchies acquired in step S901. In step S904, the precheck unit 305 determines whether a path to the folder acquired in step S902 exceeds the upper limit on the number of folder hierarchies. If the folder path exceeds the upper limit (YES in step S904), the processing proceeds to step S905. In step S905, the precheck unit 305 records the folder path acquired in step S902 in a temporary storage device. At this time, the folder path may be recorded for a higher hierarchy in a range in which the folder path does not exceed the upper limit and subfolders under the higher hierarchy.

In step S906, the precheck unit 305 then determines whether all folders are checked. If the precheck unit 305 determines that all the folders have been checked (YES in step S906), the processing proceeds to step S907. In step S907, the precheck unit 305 outputs a content recorded in step S905. The output may be a log as illustrated in FIG. 8, or may be displayed on the UI 601.

Figure 10:
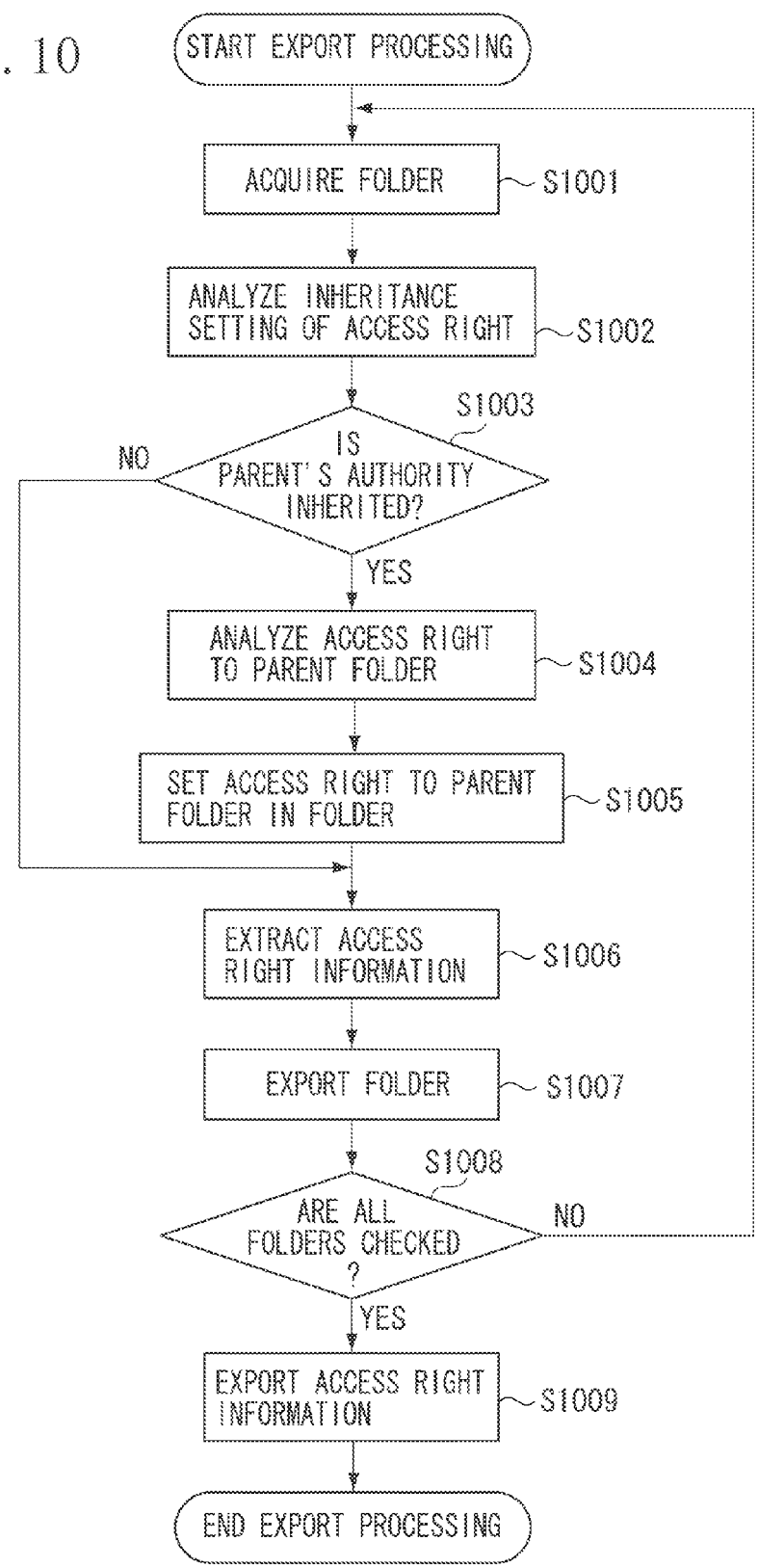
FIG. 10 is a flowchart of export processing.

FIG. 10 is a flowchart illustrating a flow of data export processing in the data exporter 201. In the present exemplary embodiment, folder export processing and access right extraction processing are described, and the other processing is omitted in the present exemplary embodiment. The export processing is performed in response to the press of the button 607 in the UI 601.

In step S1001, the data export unit 304 acquires a folder from the storage unit 203 via the DB access unit 306. In step S1002, the access right processing unit 303 examines an inheritance setting of an access right set in the folder acquired in step S1001. In step S1003, the access right processing unit 303 determines whether the inheritance setting of the access right is "inherit parent's authority". If the inheritance setting is "inherit parent's authority" (YES in step S1003), the processing proceeds to step S1004. In step S1004, the access right processing unit 303 analyzes an access right to a parent folder of the folder acquired in step S1001.

In step S1005, the access right processing unit 303 changes the inheritance setting to "set exclusive authority" for the folder acquired in step S1001, and sets the same access right as the access right to the parent folder acquired in step S1004 in the folder. Note that the access right information in the storage unit 203 is not actually rewritten at this time but access right information to be extracted as migrating information is changed.

In step S1006, the access right processing unit 303 records the access right rewritten in step S1005 in a temporary storage area. If the inheritance setting of the access right is "set exclusive authority" (NO in step S1003), the processing proceeds to step S1006. In step S1006, the access right processing unit 303 directly records the access right in the temporary storage area.

In step S1007, the data export unit 304 stores the folder acquired in step S1001 in the temporary storage area 207. If the data export unit 304 checks all folders to be migrated (YES in step S1008), the processing proceeds to step S1009. In step S1009, the log output unit 302 outputs access right information relating to all the folders stored in the temporary storage area.

A format at this time may be any format, including a comma separated value (CSV) format and an extensible markup language (XML) format, as long as it can be understood by the data importer 204. The file is stored in the temporary storage area 207.

The access right information may be written to the file for each folder. Alternatively, access right processing may be performed separately from folder and document export processing.

FIG. 11 is a flowchart illustrating a flow of data import in the data importer 204. In the present exemplary embodiment, folder import processing and access right processing are described, and the other processing is omitted. As to the processing performed by the limit check unit 405, only the check of the number of folder hierarchies will be described. The import processing is performed in response to the press of the button 707 in the UI 701.

In step S1101, the data import unit 404 acquires a folder from the temporary storage area 207. In step S1102, the limit check unit 405 checks whether a folder to be imported exceeds an upper limit of the number of hierarchies.

If the folder to be imported exceeds the upper limit on the number of hierarchies (YES in step S1102), the folder to be imported is imported to a shallower hierarchy not exceeding the upper limit on the number of hierarchies, and therefore the processing proceeds to step S1103. In step S1103, the limit check unit 405 generates link information for linking a storage location after migration of the folder and a folder corresponding to a parent folder stored before migration.

For example, a file in which information for specifying a storage location after migration of the folder is recorded is generated as link information, and the generated link information is stored in a parent folder to which the folder was supposed to be imported. More specifically, a content of the link information represents a storage location of a folder in a lower hierarchy to be imported to a different hierarchy from that before migration. Therefore, the link information stored in the parent folder is referred to so that the folder in the lower hierarchy, which has been imported after division, can be specified.

Further, a link for specifying a parent folder before migration from the folder may be generated. For example, a file in which information for specifying a storage location of the parent folder where the folder has existed before migration is recorded may be generated as second link information, and the second link information may be stored in the same hierarchy as that including the folder after migration (or in the folder).

In step S1104, the data import unit 404 imports the folder via the DB access unit 406. While an import destination may be any location as long as it is effective to clear the upper limit on the number of hierarchies, it may be desirably a shallower hierarchy. If the data import unit 404 determines that the folder to be imported does not exceed the upper limit (NO in step S1102), the processing proceeds to step S1105. In step S1105, the data import unit 404 directly imports the folder to be imported to the same hierarchy as that before migration.

In step S1106, the access right processing unit 403 then accesses a file including access right information existing in the temporary storage area 207, and acquires the access right information relating to the folder acquired in step S1101.

In step S1107, the access right processing unit 403 analyzes an access right to a parent folder of the folder, which has been imported in step S1104 or S1105. At this time, note that the parent folder is a parent folder in the storage unit 206, that is, a folder hierarchy after migration becomes a target.

In step S1108, the access right processing unit 403 compares the access right acquired in step S1106 with the access right acquired in step S1107. If the access rights are equal to each other (YES in step S1108), the processing proceeds to step S1109. In step S1109, the access right processing unit 403 changes an inheritance setting of the access right acquired in step S1106 into "inherit parent's authority". In step S1110, the access right processing unit 403 sets the access right in the folder via the DB access unit 406.

If the processing is completed for all the folders existing in the temporary storage area 207 (YES in step S1111), the processing ends. The access right processing may be performed after the import processing of the folders and documents has been performed.

Figure 12C:
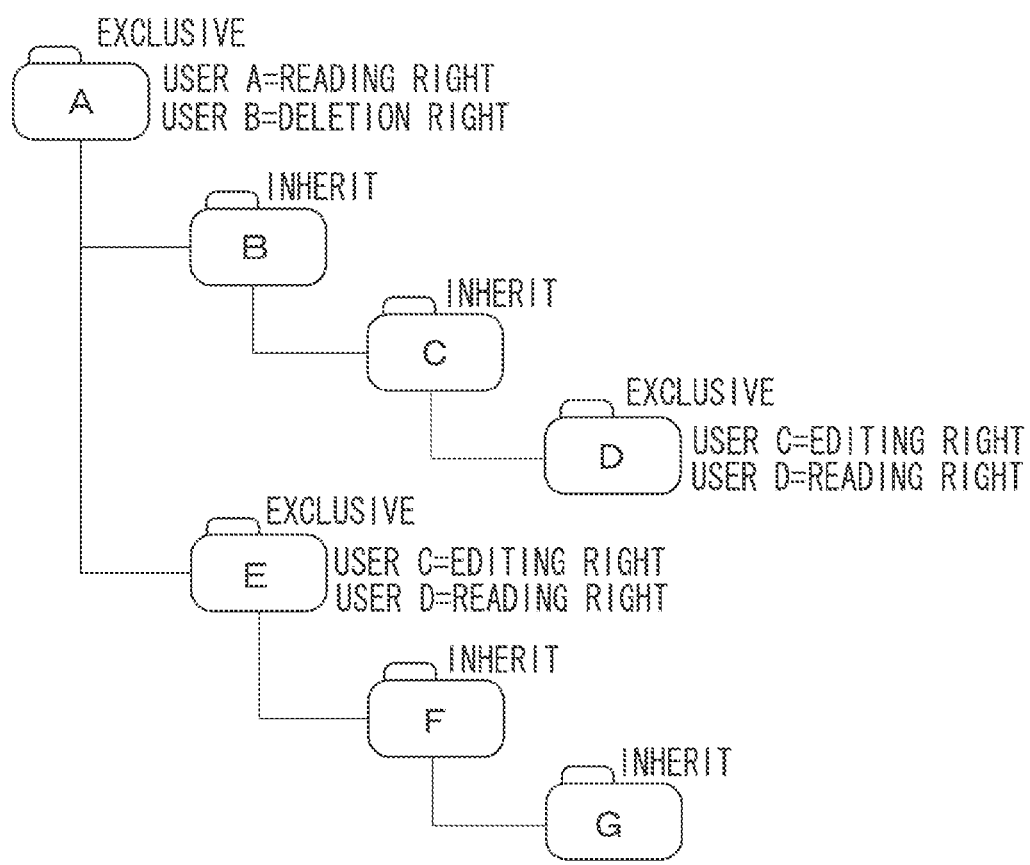
FIG. 12C illustrates an example of data migration and an access right after migration.

FIGS. 12A, 12B, and 12C respectively illustrate examples of how data is migrated and access rights are set. FIG. 12A illustrates an example of folder hierarchies and access rights, which are stored in the storage unit 203 before migration. A folder 1201 includes a folder A to a folder G. A parent of the folder B is the folder A. An access right inheritance setting 1202 includes "exclusive" representing "set exclusive authority" and "inherit" representing "inherit parent's authority". An access right 1203 includes a reading right, a deletion right, and an editing right.

FIG. 12B illustrates an example of a state where data in the storage unit 203 is exported, and is stored in the temporary storage area 207. All the access right inheritance settings set to "inherit" in FIG. 12A are changed into "exclusive". Actually, an access right is not necessarily set for a folder, and is separately managed as access right information.

FIG. 12C illustrates an example of folder hierarchies and access rights, which are stored in the storage unit 206 after migration. In this example, the folder E and the subsequent folders are assumed to exceed an upper limit on the number of hierarchies, and are moved to under a folder A. As to an access right to a folder, an inheritance setting of the same access right as the access right to a parent folder of the folder is changed to "inherit".

While the inheritance setting for the folder E is "inherit" in FIG. 12A, the inheritance setting for the folder E illustrated in FIG. 12C is "exclusive" when the folder E is moved to under the folder A.

Link information representing a storage location of the folder E illustrated in FIG. 12C is stored in the folder D illustrated in FIG. 12C. Link information representing a storage location of the folder D illustrated in FIG. 12C is stored in the folder E illustrated in FIG. 12C.

A second exemplary embodiment of the present invention will be described with reference to FIGS. 13 and 14. The second exemplary embodiment differs from the first exemplary embodiment in export processing and import processing, and therefore only different portions will be described, and description of the same portions is omitted.

Figure 13:
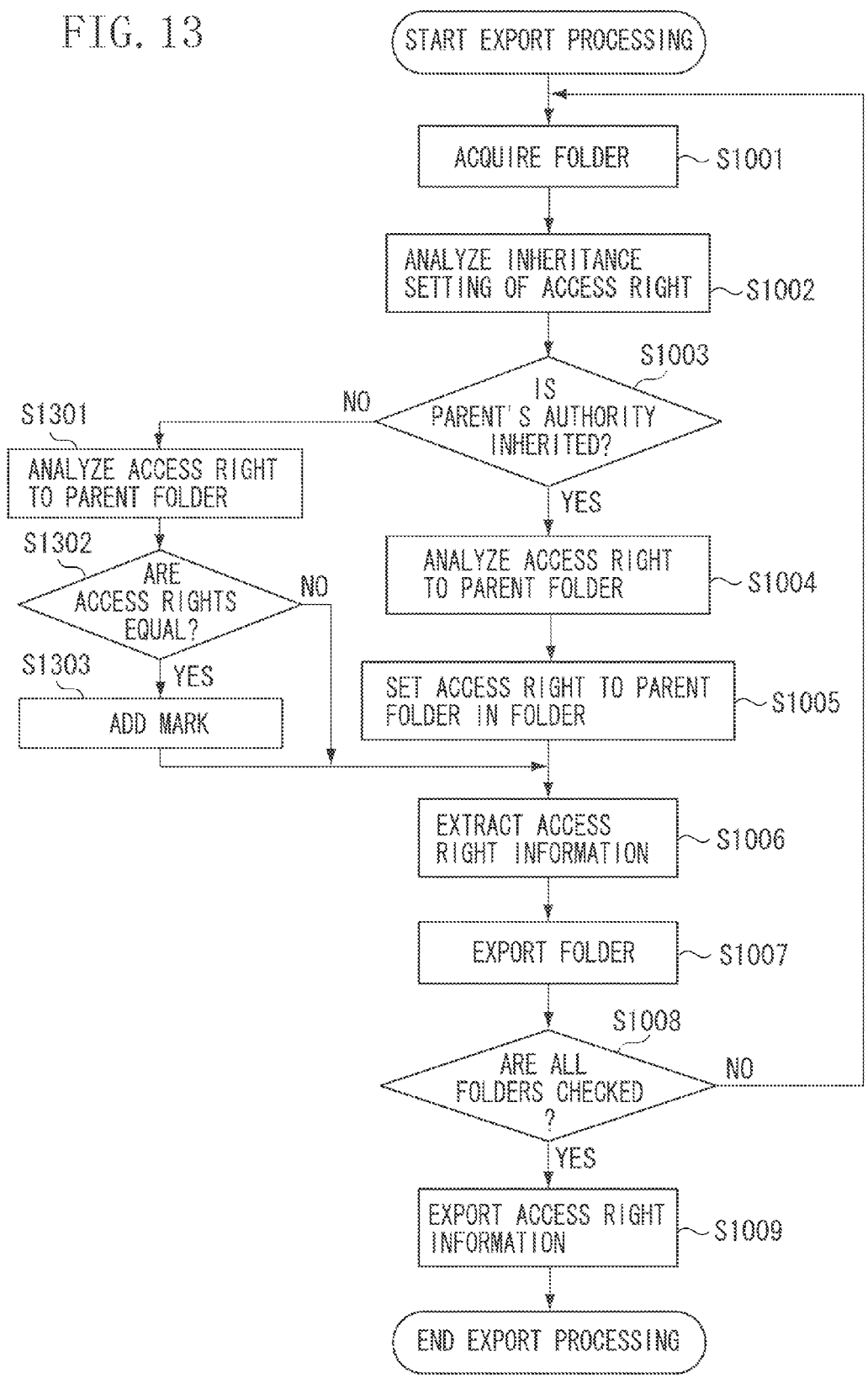
FIG. 13 is a flowchart of export processing.

FIG. 13 is a flowchart illustrating a flow of data export processing in a data exporter 201. FIG. 13 is the same as FIG. 10 except that steps S1301 to S1303 are added, and therefore only steps S1301 to S1303 will be described.

In step S1301, an access right processing unit 303 examines an access right to a parent folder of a folder acquired in step S1001. In step S1302, the access right processing unit 303 then determines whether an access right to the folder acquired in step S1001 and the access right acquired in step S1301 are the same. If the access rights are the same (YES in step S1302), the processing proceeds to step S1303. In step S1303, the access right processing unit 303 marks the folder acquired in step S1001. Examples of marking means adding one column in access right information to be exported in step S1009 and adding a Boolean value to each of folders.

Figure 14:
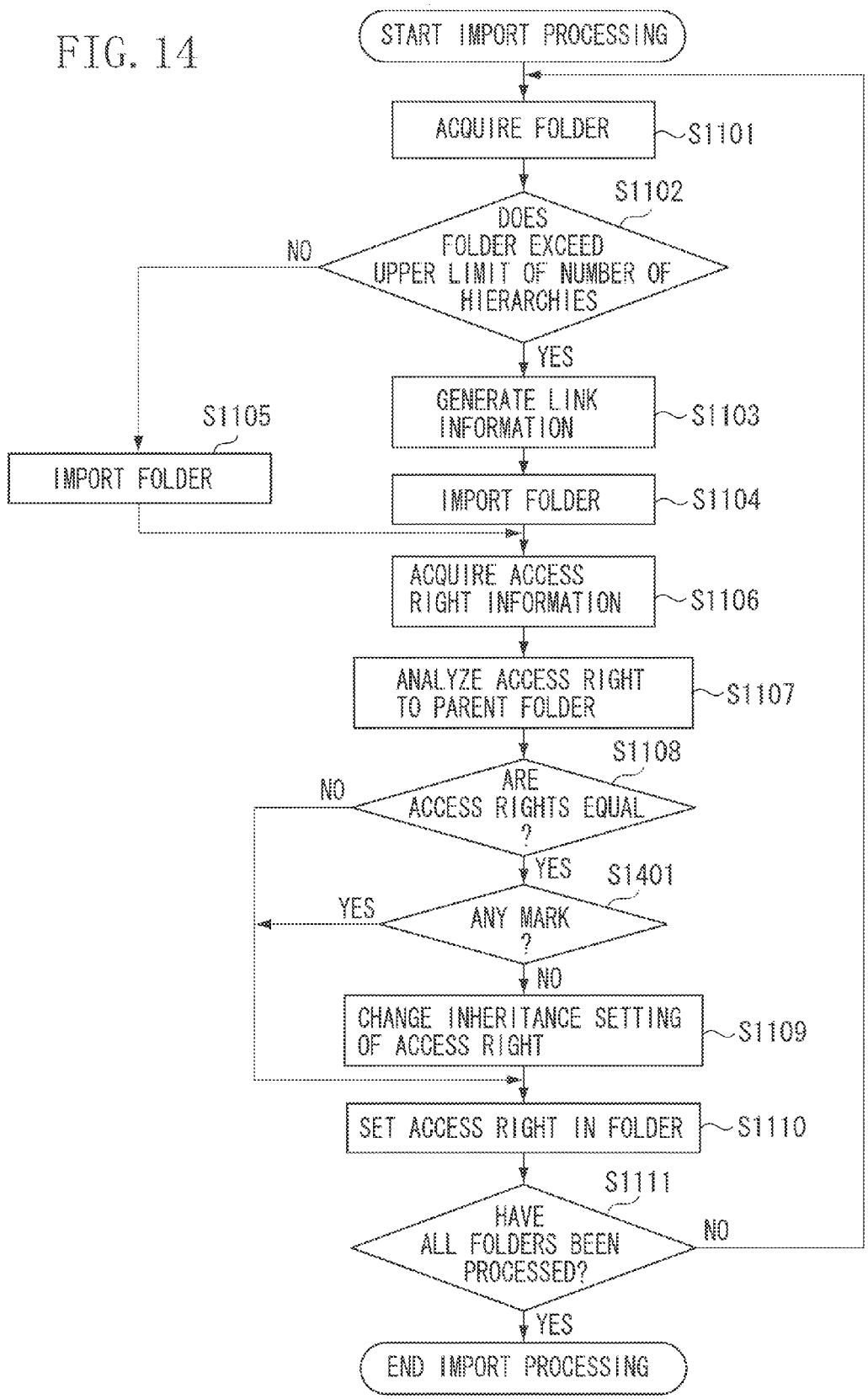
FIG. 14 is a flowchart of import processing.

FIG. 14 is a flowchart illustrating a flow of data import in the data importer 204. FIG. 14 is the same as FIG. 11 except that step S1401 is added, and therefore only step S1401 will be described.

If access rights are equal to each other (YES in step S1108), the processing proceeds to step S1401. In step S1401, an access right processing unit 403 checks whether there is no mark on access right information relating to a folder acquired in step S1101. If there is a mark (YES in step S1401), the processing in step S1109 is skipped.

While an inheritance setting of an access right to a folder, which is the same as that to a parent folder of the folder, is "set exclusive authority" before migration by the above-mentioned processing, it remains "set exclusive authority" without being changed to "inherit parent's authority" after migration.

A third exemplary embodiment of the present invention will be described with reference to FIGS. 15 and 16.

The third exemplary embodiment differs from the first exemplary embodiment in import processing and the type of access right inheritance setting in a destination document management application 205, and therefore only different portions will be described.

In the third exemplary embodiment, an inheritance setting in which an access right inheritance destination can be selected is prepared as the type of access right inheritance setting in the destination document management application 205. More specifically, the inheritance setting includes "inherit an access right to a folder "xxx"" in addition to "set exclusive authority" and "inherit parent's authority".

A path to a folder, for example, is substituted into "xxx". If a user issues an access request to a folder assigned the inheritance setting, the destination document management application 205 confirms an access right with a folder designated by the inheritance setting.

Figure 15:
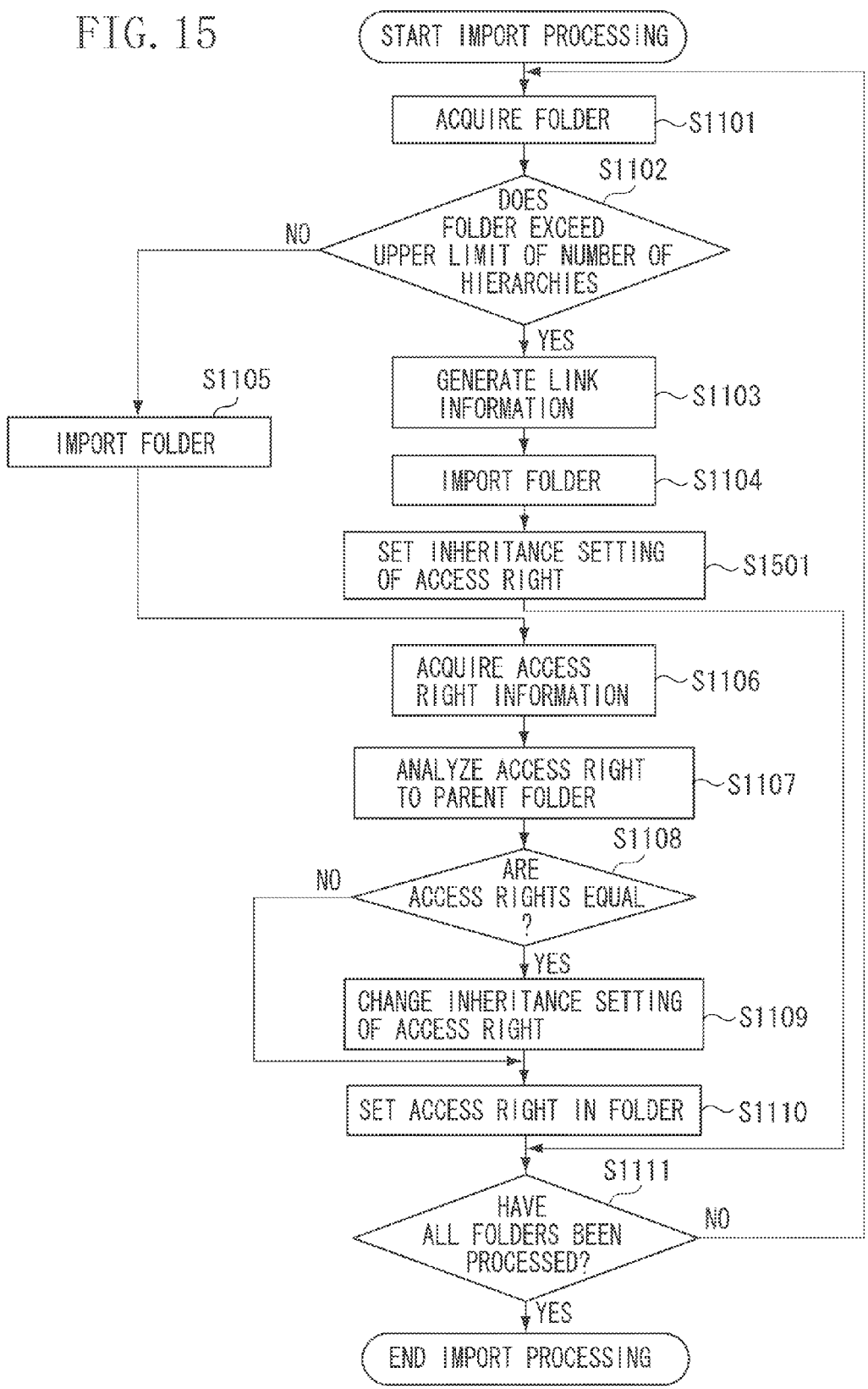
FIG. 15 is a flowchart of import processing.

FIG. 15 is a flowchart illustrating a flow of data import in a data importer 204. FIG. 15 is the same as FIG. 11 except that step S1501 is added, and therefore only step S1501 will be described.

In step S1104, the data importer 204 imports a folder. In step S1501, an access right processing unit 403 sets an inheritance setting of an access right to the imported folder to inherit an access right to a parent folder before migration. The subsequent processing is skipped, to perform processing for the subsequent folder, unlike in FIG. 11.

Figure 16:
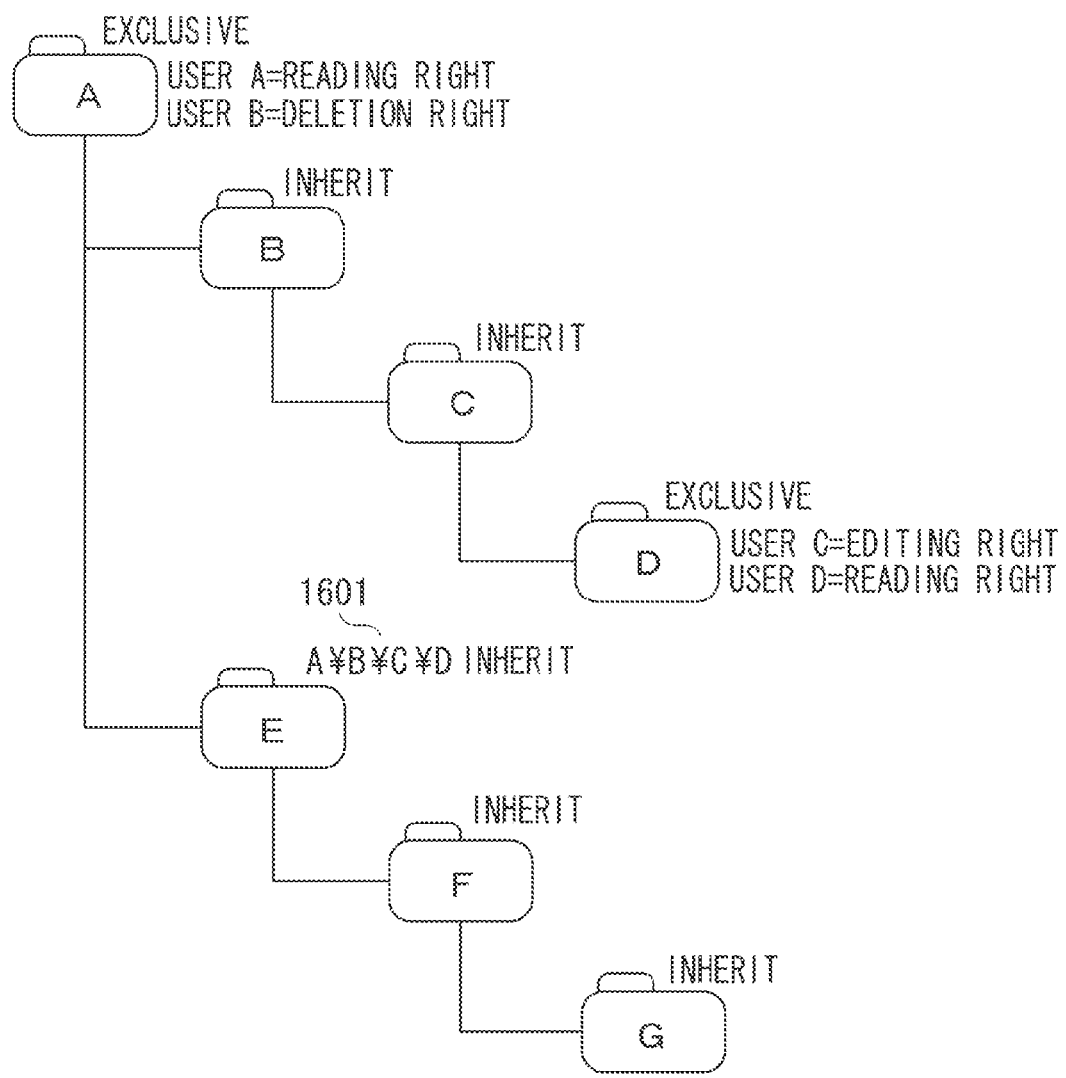
FIG. 16 illustrates an example of data migration and an access right after migrating.

FIG. 16 illustrates a way of setting an access right after data migration, and illustrates an example of folder hierarchies and access rights, which are stored in a storage unit 206 after migration. In an access right inheritance setting 1601, an access right to a folder D serving as a parent folder before migration is inherited.

Even when the access right to the folder D in FIG. 16 is changed, for example, by the above-mentioned processing, a folder E that has been moved to another hierarchy can inherit the access right to the folder D.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-239982 filed Oct. 26, 2010, which is hereby incorporated by reference herein in its entirety.

What is claimed is:

1. A data migration system for migrating data managed in a folder having a hierarchical structure from a source document management application to a destination document management application, which differs in an upper limit on the number of hierarchies from the source document management application, the data migration system comprising at least one processor communicatively-coupled to a memory, which functions as:

a setting unit configured to change, when an inheritance setting of an access right set in a folder to be migrated in the source document management application is an inheritance setting for inheriting an access right to a parent folder, the inheritance setting in the folder to be migrated to an inheritance setting for setting an access right exclusively for the folder while setting a similar access right to the access right to the parent folder in the folder to be migrated;

an export unit configured to export the folder to be migrated, data included in the folder, and information relating to an access right to the folder;

an import unit configured to import, when a hierarchy including the folder to be migrated, which has been exported by the export unit, exceeds the upper limit on the number of hierarchies in the destination document management application, a folder under the hierarchy exceeding the upper limit and data included in the folder to a hierarchy shallower than the upper limit in the destination document management application; and a change unit configured to change, when an access right to the folder imported by the import unit, which has been analyzed based on the access right information, and an access right to a parent folder of the folder are equal to each other, an inheritance setting of the access right to the folder imported by the import unit to an inheritance setting for inheriting the access right to the parent folder.

2. The data migration system according to claim 1, wherein the change unit does not change, when the imported folder is a folder, which is equal in an access right to the parent folder and in which the inheritance setting for setting the access right exclusively for the folder is set, in the source document management application, the inheritance setting in the folder even when the access right to the folder and the access right to the parent folder of the folder are equal to each other.

3. A data migration system for migrating data relating to a plurality of folders and documents, which has been managed in a first source document management application to a second destination document management application, the data migration system comprising at least one processor communicatively-coupled to a memory, which functions as:

a setting unit configured to change, for a folder, in which an inheritance setting of an access right is a first inheritance setting for inheriting an access right to a parent folder, of a plurality of folders, which has been managed in the first document management application, the inheritance setting of the access right to a second inheritance setting for setting an access right exclusively for the folder while setting the same access right as the access right to the parent folder;

a determination unit configured to sequentially use the plurality of folders, which has been managed in the first document management application, as a folder to be migrated after the setting unit has performed the processing, and determine whether a hierarchy including the folder to be processed when the plurality of folders has been managed in the first document management application exceeds an upper limit on the number of hierarchies in the second document management application; and an import unit configured to store, when the determination unit determines that the hierarchy including the folder to be processed is within the upper limit, the folder to be processed in a hierarchy in the second document management application, which corresponds to the hierarchy including the folder to be processed when the plurality of folders has been managed in the first document management application, while storing the folder to be processed in a shallower hierarchy in the second document management application when the determination unit determines that the hierarchy including the folder to be processed exceeds the upper limit.

4. The data migration system according to claim 3, further comprising a change unit configured to change, when the access right to the folder to be processed, which has been stored by the import unit, and an access right to a parent folder of the folder to be processed after being stored by the import unit are equal to each other, an inheritance setting of the access right to the folder to be processed, which has been stored by the import unit, to the first inheritance setting for inheriting the access right to the parent folder.

5. The data migration system according to claim 4, wherein the change unit does not change, when the inheritance setting of the access right to the folder to be processed in the first document management application is the second inheritance setting for setting the access right exclusively for the folder, the inheritance setting of the access right to the folder to be processed, which has been stored by the import unit, to the first inheritance setting.

6. The data migration system according to claim 3, wherein the import unit further stores, when the determination unit determines that the hierarchy including the folder to be processed exceeds the upper limit, link information for linking the folder to be processed and a folder corresponding to the parent folder when the plurality of folders has been managed in the first document management application.

7. A data migration method for migrating data managed in a folder having a hierarchical structure from a source document management application to a destination document management application, which differs in an upper limit on the number of hierarchies from the source document management application, the data migration method comprising:

changing, when an inheritance setting of an access right set in a folder to be migrated in the source document management application is an inheritance setting for inheriting an access right to a parent folder, the inheritance setting in the folder to be migrated to an inheritance setting for setting the access right exclusively for the folder while setting a similar access right to the access right to the parent folder in the folder to be migrated;

exporting the folder to be migrated, data included in the folder, and information relating to an access right to the folder;

importing, when a hierarchy including the folder to be migrated, which has been exported in the exporting, exceeds the upper limit on the number of hierarchies in the destination document management application, a folder under the hierarchy exceeding the upper limit and data included in the folder to a hierarchy shallower than the upper limit in the destination document management application; and changing, when an access right to the folder imported in the importing, which has been analyzed based on the access right information, and an access right to a parent folder of the folder are equal to each other, an inheritance setting of the access right to the folder imported in the importing to an inheritance setting for inheriting the access right to the parent folder.

8. A data migration method performed by a computer to shift data relating to a plurality of folders and documents, which have been managed in a first source document management application to a second destination document management application, the data migration method comprising:

changing, for a folder, in which an inheritance setting of an access right is a first inheritance setting for inheriting an access right to a parent folder, of the plurality of folders, which has been managed in the first document management application, the inheritance setting of the access right to a second inheritance setting for setting an access right exclusively for the folder while setting the same access right as the access right to the parent folder;

sequentially using the plurality of folders, which has been managed in the first document management application, as a folder to be migrated after the processing in the setting has been performed, and determining whether a hierarchy including the folder to be processed when the plurality of folders has been managed in the first document management application exceeds an upper limit on the number of hierarchies in the second document management application; and storing, when it is determined in the determining that the hierarchy including the folder to be processed is within the upper limit, the folder to be processed in a hierarchy in the second document management application, which corresponds to the hierarchy including the folder to be processed when the plurality of folders has been managed in the first document management application, while storing the folder to be processed in a shallower hierarchy in the second document management application when it is determined in the determining that the hierarchy including the folder to be processed exceeds the upper limit.

9. A non-transitory computer-readable storage medium storing a computer program for migrating data managed in a folder having a hierarchical structure from a source document management application to a destination document management application, which differs in an upper limit on the number of hierarchies from the source document management application, the computer program causing a computer to function as:
   a setting unit configured to change, when an inheritance setting of an access right set in a folder to be migrated in the source document management application is an inheritance setting for inheriting an access right to a parent folder, the inheritance setting in the folder to be migrated to an inheritance setting for setting an access right exclusively for the folder while setting a similar access right to the access right to the parent folder in the folder to be migrated;
   an export unit configured to export the folder to be migrated, data included in the folder, and information relating to an access right to the folder;
   an import unit configured to import, when a hierarchy including the folder to be migrated, which has been exported by the export unit, exceeds the upper limit on the number of hierarchies in the destination document management application, a folder under the hierarchy exceeding the upper limit and data included in the folder to a hierarchy shallower than the upper limit in the destination document management application; and
   a change unit configured to change, when the access right to the folder imported by the import unit, which has been analyzed based on the access right information, and an access right to a parent folder of the folder are equal to each other, an inheritance setting of the access right to the folder imported by the import unit to an inheritance setting for inheriting the access right to the parent folder.

10. The non-transitory computer-readable storage medium according to claim 9, wherein the change unit does not change, when the imported folder is a folder, which is equal in an access right to the parent folder and in which the inheritance setting for setting the access right exclusively for the folder is set, in the source document management application, the inheritance setting in the folder even when the access right to the folder and the access right to the parent folder of the folder are equal to each other.

11. A non-transitory computer-readable storage medium storing a computer program for migrating data relating to a plurality of folders and documents, which have been managed in a first source document management application to a second destination document management application, the computer program causing a computer to function as:
   a setting unit configured to change, for a folder, in which an inheritance setting of an access right is a first inheritance setting for inheriting an access right to a parent folder, of a plurality of folders, which has been managed in the first document management application, the inheritance setting of the access right to a second inheritance setting for setting an access right exclusively for the folder while setting the same access right as the access right to the parent folder;
   a determination unit configured to sequentially use the plurality of folders, which has been managed in the first document management application, as a folder to be migrated after the setting unit has performed the processing, and determine whether a hierarchy including the folder to be processed when the plurality of folders has been managed in the first document management application exceeds an upper limit on the number of hierarchies in the second document management application; and
   an import unit configured to store, when the determination unit determines that the hierarchy including the folder to be processed is within the upper limit, the folder to be processed in a hierarchy in the second document management application, which corresponds to the hierarchy including the folder to be processed when the plurality of folders has been managed in the first document management application, while storing the folder to be processed in a shallower hierarchy in the second document management application when the determination unit determines that the hierarchy including the folder to be processed exceeds the upper limit.

12. The non-transitory computer-readable storage medium according to claim 11, wherein the computer program causes the computer to further function as:
   a change unit configured to change, when the access right to the folder to be processed, which has been stored by the import unit, and the access right to a parent folder of the folder to be processed after being stored by the import unit are equal to each other, an inheritance setting of the access right to the folder to be processed, which has been stored by the import unit, to the first inheritance setting for inheriting the access right to the parent folder.

13. The non-transitory computer-readable storage medium according to claim 12, wherein the change unit does not change, when the inheritance setting of the access right to the folder to be processed in the first document management application is the second inheritance setting for setting the access right exclusively for the folder, the inheritance setting of the access right to the folder to be processed, which has been stored by the import unit, to the first inheritance setting.

14. The non-transitory computer-readable storage medium according to claim 11, wherein the import unit further stores, when the determination unit determines that the hierarchy including the folder to be processed exceeds the upper limit, link information for linking the folder to be processed and a folder corresponding to the parent folder when the plurality of folders has been managed in the first document management application.

* * * * *